Aug. 12, 1969   J. C. KREJCI ETAL   3,460,911
APPARATUS FOR PRODUCING CARBON BLACK
Original Filed May 25, 1964   2 Sheets-Sheet 1

INVENTORS
J.C. KREJCI
M.B. HOWARD
BY
*Young and Quigg*
ATTORNEYS

United States Patent Office 3,460,911
Patented Aug. 12, 1969

3,460,911
APPARATUS FOR PRODUCING CARBON BLACK
Joseph C. Krejci, Phillips, Tex., and Murl B. Howard, Bartlesville, Okla., assignors to Phillips Petroleum Company, a corporation of Delaware
Original application May 25, 1964, Ser. No. 369,876, now Patent No. 3,355,247. Divided and this application June 13, 1967, Ser. No. 645,774
Int. Cl. C10b *57/04;* C09c *1/48*
U.S. Cl. 23—259.5                    10 Claims

ABSTRACT OF THE DISCLOSURE

A carbon black furnace having a feed introduction chamber, a precombustion section and a reaction section, the hydrocarbon feed inlet assembly being movably positionable and adapted for multiple stream discharge in concentric relationship.

---

Production of a high structure furnace carbon black by introducing separate but coaxial and contiguous streams of (1) a normally liquid hydrocarbon feedstock having a BMCI value of at least 95 and (2) a free oxygen-containing gas having a free oxygen concentration of at least 33 volume percent into a body of hot combustion gases in a carbon black furnace. Said gas is introduced in an amount sufficient to supply at least 7.4 s.c.f. of oxygen per gallon of said feedstock. Said feedstock is partially burned under carbon black producing conditions by the action of the heat contained in said combustion gases and carbon black product is recovered from the effluent from said furnace. Novel apparatus is also disclosed. FIGURES 5 and 6 of the drawings are representative of said apparatus.

This application is a division of copending application Ser. No. 369,876, filed May 25, 1964, now U.S. Patent 3,355,247.

This invention relates to the production of high structure furnace carbon blacks. In one aspect this invention relates to a process for the production, from certain hydrocarbon feedstocks, of a furnace carbon black having higher structure characteristics than the carbon black normally produced from said feedstock. In another aspect this invention relates to an apparatus which can be employed in the production of furnace carbon blacks.

For several years carbon black has been produced in large quantities in furnaces. For example, it is known in the prior art to produce carbon black by directing a hot oxidizing or combustion gas in a generally helical path adjacent the periphery of a generally cylindrical reaction zone and directing a reactant material axially into said zone inside the helically-moving mass of hot gas. The reactant is thereby rapidly heated to a carbon black-forming temperature and reacted in said zone to form carbon black, which is subsequently recovered. Processes of this type are known as tangential flame processes and are illustrated in U.S. Patents 2,375,795; 2,375,796; 2,375,797; and 2,375,798 (1945). Another tangential flame type process is disclosed in U.S. Patent 2,564,700 (1951) which involves the injection of a combustible mixture of fuel and oxidizing gas circumferentially into a combustion zone and the reaction of the mixture by combustion near the periphery of said zone. The resulting combustion gas, at a high temperature, travels in a generally spiral path toward the axis of the combustion zone and is then directed in a generally helical path adjacent the periphery of a reaction zone which is contiguous with, of smaller diameter than, and in open communication with, said combustion zone. A carbonaceous reactant is directed along the common axis of said zones and is rapidly heated to a carbon black-forming temperature by virtue of heat directly imparted from the helically-moving combustion gas. The reactant is reacted within the reaction zone to form carbon black, which is subsequently recovered. This type of tangential flame process is known as a precombustion process, since the hot gas is substantially completely formed by combustion prior to contact with the reactant.

The reaction mixture formed in processes of the type above described comprises a suspension of a carbon black in combustion gas. It is known in the prior art to withdraw such a mixture from the reaction zone and to cool the mixture suddenly by the direct injection thereinto of a cooling liquid, such as water, in order to cool the mixture suddenly to a temperature at which no further reaction can occur.

In said tangential flame processes, there is introduced coaxially with the stream of carbonaceous reactant a separate relatively small stream of air. In the prior art this stream of air is known as "jacket air" and is introduced as an annular stream through an annular space provided around the reactant hydrocarbon feed tube. Jacket air passing through said annular space is intended to keep the inner end of the hydrocarbon reactant feed tube cool and prevent deposition of carbon thereon or, if carbon does deposit on the end of said tube, to assist in its removal by combustion. However, said jacket air is not essential to the process.

The larger part of the carbon black produced today is used as a reinforcing agent for rubber. By far the larger part of the compounded rubber material containing carbon black is designed specifically for tire treads or tire carcasses. The state of the rubber compounding art has advanced to such a degree that the properties of the carbon black used in such compounding must be controlled within narrow limits. Such a control of all of the desired properties of the carbon black is oftentimes difficult to achieve.

One of the most important properties of a carbon black when used in the compounding of rubber for use in tire manufacturing is commonly referred to as "structure." There is a close correlation between the structure of a carbon black and the modulus of a rubber product compounded with said carbon black. Other properties being comparable, high structure carbon blacks normally yield high modulus rubber and low structure carbon blacks normally yield low modulus rubber.

By the term "structure," as applied herein to carbon black, is meant characteristics of the carbon black particles which relate to flocculation of said particles. The structure is said to be high when there is a strong tendency for the particles to form chains of particles. Conversely, the structure is said to be low when there is little tendency to form such chains. "High structure" carbon black is generally considered in the prior art to have an oil absorption of about 1.35 to 1.45 cc. per gram and this is the usual range for prior art furnace blacks. "Normal structure" carbon black is generally considered in the prior art to have an oil absorption of about 0.75 to 1.2 cc. per gram and in the prior art such blacks have generally been made by the channel black process. "Low structure" carbon black is generally considered in the prior art to have an oil absorption of about 0.45 to 0.55 cc. per gram and in the prior art such blacks are made by the thermal process. Each of these blacks has certain applications for which it is preferred.

Since it is not convenient to measure the structure directly, the oil absorption of the black is commonly used as a "measure" of the structure. It has been found that the oil absorption of a carbon black correlates well with certain properties, such as modulus, of a rubber having the carbon black compounded therein. Measurement of oil absorption gives a quick reliable measure of the structure of the carbon black. It is thus possible to obtain a rapid measure of one of the most important properties of carbon black insofar as rubber compounds prepared with said carbon black are concerned.

Furnace carbon blacks having high structure characteristics have several advantages in the compounding of rubber. For example, they are "easy processing," i.e., are readily compounded into the rubber. Another advantage is that rubber compounded with high structure carbon blacks possesses superior extrusion properties. For many of the applications where high structure furnace blacks are preferred, it would be desirable to have carbon blacks of higher structure than can normally be produced by furnace processes. We have now discovered a method for increasing the structure of a carbon black product produced in a furnace process from certain hydrocarbon oils. This is accomplished by the substitution of free oxygen for at least a portion of said "jacket air."

As indicated above, the process of the invention is not applicable to all normally liquid hydrocarbon feedstocks. We have further discovered that the substitution of free oxygen for a portion of the jacket air has only a very minor effect when the hydrocarbon reactant oil has a BMCI value (U.S. Bureau of Mines Coorelation Index, defined further hereinafter) of less than 95.

Thus, broadly speaking, the present invention resides in a process for producing a furnace carbon black having increased high structure characteristics from a normally liquid hydrocarbon feedstock having a BMCI value of at least 95, by introducing separate but coaxial and contiguous streams of (1) said feedstock and (2) a free oxygen-containing gas having a free oxygen concentration of at least 33 volume percent into a carbon black furnace, said gas being introduced in an amount sufficient to supply at least 7.4 s.c.f. (standard cubic feet at 60° F.) of oxygen per gallon of said feedstock, partially burning said feedstock in said furnace under carbon black producing conditions to produce said carbon black, and recovering said carbon black from the effluent from said furnace.

An object of this invention is to provide valuable carbon blacks and methods of making the same. Another object of this invention is to provide a process for producing a furnace carbon black having increased structure characteristics or oil absorption values. Another object of this invention is to controllably increase the structure characteristics or oil absorption value of a furnace carbon black produced by the decomposition of a hydrocarbon in a carbon black furnace. Still another object of this invention is to provide a process for making a furnace carbon black, from a given hydrocarbon feedstock of a BMCI value of at least 95, having higher structure characteristics than the carbon black which normally would be produced from said hydrocarbon feedstock. Another object of this invention is to provide a process of regulating and controlling the properties of furnace carbon blacks so as to satisfy prescribed and predetermined requirements for the properties of said carbon blacks. Another object is to provide an apparatus which can be employed to produce furnace carbon blacks having increased structure characteristics. Other aspects, objects, and advantages of the invention will be apparent to those skilled in the art in view of this disclosure.

Thus, according to the invention, there is provided a process for producing a furnace carbon black product having increased structure characteristics, which process comprises: introducing a normally liquid hydrocarbon feedstock stream having a BMCI value of at least 95 into a carbon black producing furnace; introducing an annular, free oxygen-containing gas stream having a free oxygen concentration of at least 33 volume percent into said furnace contiguous to and surrounding said feedstock stream and in an amount sufficient to supply at least 7.4 s.c.f. of oxygen per gallon of said feedstock; partially burning said feedstock under carbon black producing conditions to produce said carbon black; and recovering said carbon black product from the effluent from said furnace.

It will be noted the free oxygen-containing gas stream is introduced in a manner surrounding the feedstock stream and in an amount which provides at least 7.4 s.c.f. oxygen per gallon of said feedstock. It should also be noted that in the practice of the invention the jacket gas stream contains more than one-third more oxygen than does air, and that the feedstock has a BMCI value of at least 95.

Further according to the invention, there is provided a carbon black furnace which can be employed in the practice of the invention for the production of furnace carbon blacks having increased structure characteristics.

The furnace carbon blacks produced in accordance with the invention are characterized by higher than normal modulus properties in rubber, i.e., said carbon blacks impart modulus values to rubber which are higher than what would normally be expected from a furnace carbon black produced from the feedstock used. The feedstock may be one that in the absence of this invention usually yields a high modulus carbon black, or the feedstock may be one that usually yields a normal modulus carbon black. It is also within the scope of the invention to produce higher than normal modulus furnace blacks from feedstocks which usually yield what is generally considered a low modulus carbon black. In any event, the carbon black produced in the practice of the invention is characterized by a higher modulus in rubber than would be expected to be produced from the feedstock being used.

Thus, herein and in the claims, unless otherwise specified, the term "higher than normal modulus" when applied to a furnace carbon black, refers to a carbon black which when compounded in rubber imparts a modulus property to said rubber which is higher than would be expected for a carbon black produced from the particular feedstock being used.

Suitable feedstocks for use in the practice of the invention are normally liquid hydrocarbons having a BMCI value of at least 95, preferably at least 100. There is no real upper limit on the BMCI values of the hydrocarbon oils which can be used in the practice of the invention. However, for practical purposes, the oils preferred for use in the practice of the invention can be described as having BMCI values within the range of from 95 to 140, preferably 100 to 140. The presently most preferred oils are those which in addition have a molecular weight of at least 260.

The oxygen-containing gases utilized in the practice of the invention as jacket gas can be a mixture of air and added free oxygen or can be essentially pure oxygen. In the practice of the invention said free oxygen-containing jacket gas should contain at least 33, preferably at least 50, volume percent of free oxygen. The oxygen used in the practice of the invention is the ordinary commercial oxygen of commerce containing at least 99, more usually at least 99.5+, volume percent oxygen. Thus, herein and in the claims, unless otherwise specified, the term "essentially pure oxygen" refers to oxygen having a concentration of at least 99 volume percent oxygen. It is frequently preferred to use essentially pure oxygen as the jacket gas.

In the practice of the invention the free oxygen-containing jacket gas is used in an amount sufficient to provide an oxygen to oil ratio of at least 7.4, preferably at least 10, s.c.f. of oxygen per gallon of liquid hydrocarbon feedstock charged to the furnace. Usually said oxygen to oil ratio will be within the range of 7.4 to 40, more usually 10 to 30. The term "oxygen to oil ratio" as used herein and in the claims, unless otherwise specified, refers to a ratio which has been corrected when necessary for the amount of nitrogen present. Said ratio is calculated from the empirical formula $$\text{Ratio} = \frac{\text{s.c.f. of oxygen}}{\text{gallons of oil}} \left(1 - 0.013 \frac{\text{s.c.f. of nitrogen}}{\text{gallons of oil}}\right)$$

Obviously when essentially pure oxygen is used at the jacket gas the formula becomes, Ratio=s.c.f. of oxygen/ gallons of oil.

We have also discovered that the linear velocity of the jacket oxygen stream influences the structure characteristics or oil absorption values obtained in the practice of the invention. In general, other factors being substantially equal, an increase in the linear velocity of the oxygen-containing stream in the jacket, i.e., nozzle velocity, causes a decrease in the amount of structure increase which is obtained. Thus, in the practice of the invention, it is preferred to operate with a linear velocity on the jacket oxygen stream within the range of from 40 to 250, more preferably within the range of from 100 to 200, fee per second. However, linear velocities outside these ranges can be employed in the practice of the invention with beneficial results.

Figure 1:
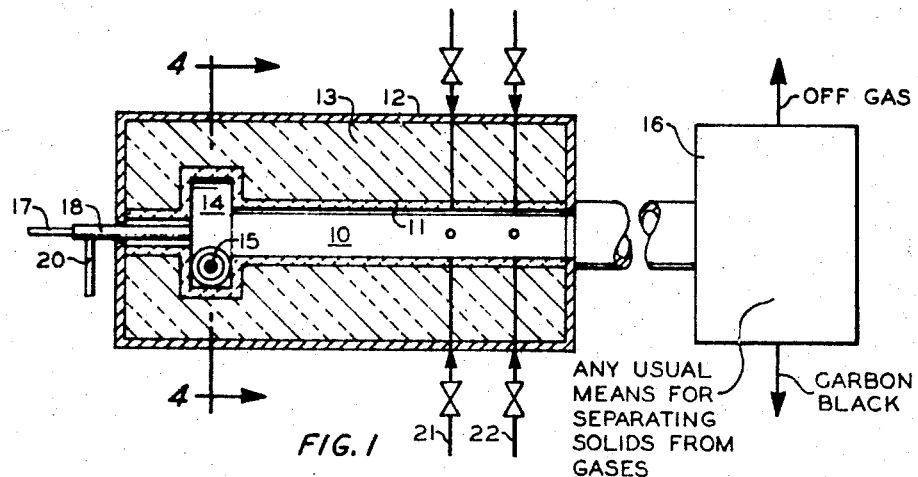
FIGURE 1 is an illustration, partly in cross section, of one form of apparatus which can be employed in the practice of the invention.

Referring now to the drawings, wherein like reference numerals have been employed to denote like elements, the invention will be more fully explained. FIGURE 1 illustrates in diagrammatic form the general structure and general shape of one presently preferred type of carbon black furnace and associated apparatus which can be employed in the practice of the invention. In said FIGURE 1 there is shown a reaction section 10 having a refractory lining 11 made of a highly refractory material such as sillimanite, alumina, or other refractory materials suitable for the purpose. A steel shell 12 containing insulating material 13 surrounds said refractory liner. At the inlet end of the furnace there is a short section 14 having a diameter considerably larger than the diameter of reaction section 10. This larger diameter section 14 is essentially a combustion chamber in which a combustible mixture of a gas, such as natural gas, and an oxygen-containing gas, such as air, is burned. Said combustible mixture is injected into said combustion chamber 14 through an inlet tube 15 which is so positioned that the gases enter said combustion chamber in a direction tangent to the cylindrical wall thereof. Upon continued injection of the combustible mixture, the flame and combustion products follow a spiral path toward the axis of said combustion chamber 14. When the spiral becomes less than the diameter of reaction section 10, the gaseous flow changes from a spiral to a helix, and following this latter pattern the gases enter said reaction section 10, remain adjacent the wall thereof, and finally pass into the carbon black recovery apparatus 16.

Reactant hydrocarbon oil, from a source not shown, passes through a preheater, also not shown, and finally passes through feed conduit 17 which is arranged axially so that feed introduced therethrough will be introduced along the axis of said combustion chamber 14. Surrounding said feed conduit 17 is a larger conduit 18, called an "air jacket" in the prior art, but referred to in the practice of this invention as a "gas jacket." The arrangement of said two conduits 17 and 18 defines an annular space 19 (see FIGURES 2 and 3) through which the jacket gas is passed into the furnace. In the prior art where air, introduced via conduit 20, is passed through said annular space 19, said air is intended to keep the inner end of feed conduit 17 cool to prevent the deposition of carbon thereon.

It is not essential that the downstream end portion of reaction section 10 have a constant diameter as illustrated. If desired, the downstream end portion of said reaction section can be provided with an enlarged diameter so as to provide increased residence time under carbon black producing conditions without unduly increasing the length of said reaction section. For example, in one embodiment of the furnace here illustrated, the upstream portion of reaction section 10 can have an inner diameter of 12 inches and any suitable length, e.g., up to 10 or 11 feet and the downstream portion of said reaction section can have an inner diameter of 18 inches and any suitable length, e.g., up to 10 or 11 feet. Since one foot of the 18-inch I.D. portion equals 2.25 feet of the 12-inch portion, insofar as volume is concerned, it is clear how the overall length can be varied. The combustion chamber 14 can be 12 inches in length and have a diameter of 37 inches. The above dimensions are not critical, are merely given as an example, and any and all dimensions can be varied in the practice of the invention. However, when employing a precombustion type of furnace as illustrated in FIGURE 1, the combustion chamber 14 should have a larger diameter than the reaction section 10.

Provided along the length of reaction section 10, especially in the downstream portion thereof, are a plurality of quench liquid inlet conduits 21 and 22. Said quench liquid inlet conduits are provided for the introduction of quenching liquid, usually water in liquid phase, into the reaction section to quickly quench the reaction mixture gases to a temperature below that at which carbon black formation takes place, preferably to a temperature lower than 2000° F. Quench inlet conduits 21 and 22 as shown each comprise four such inlets (three are shown) spaced 90° apart around the circumference of section 10'. Any number of inlets arranged in any suitable radial pattern can be employed. It is desirable to employ at least two inlets at each position in order to more effectively blanket the interior of the reaction section and thus more effectively quench the reaction. Each of said inlets is equipped with a suitable spray nozzle (not shown) at the inner end thereof. Said quench liquid inlet conduits can be located at any desired points along the length of the reaction section, thus providing another means for varying the effective length of the reaction section in a given furnace. The longitudinal location of the particular quench inlet conduit employed will depend upon the properties desired in the carbon black product. If the downstream end portion of reaction section 10 is enlarged in diameter as described above, said enlarged diameter portion can also be provided with a plurality of suitably spaced quench liquid inlets.

Figure 2:
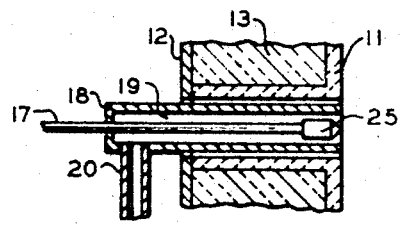
FIGURE 2 is a view, partly in cross section, of a portion of one form of the furnace illustrated in FIGURE 1.
Figure 3:
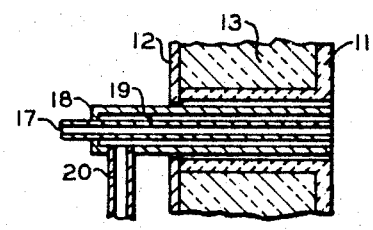
FIGURE 3 is a view in cross section of a portion of another form of the furnace illustrated in FIGURE 1.

FIGURE 2 illustrates in detail one arrangement at the upstream or inlet end wall of combustion chamber 14 which is provided for the introduction of the feed hydrocarbon oil and jacket gas. The arrangement shown in FIGURE 2 is employed when the reactant hydrocarbon oil is not vaporized or is only partially vaporized. In this arrangement a suitable spray nozzle 25 is provided on the outlet end of feed conduit 17. FIGURE 3 illustrates another arrangement of said reactant oil and jacket gas inlet apparatus. The arrangement shown in FIGURE 3 is employed when the reactant hydrocarbon oil being used is substantially all vaporized prior to introduction into the furnace. In this arrangement the outlet end of feed conduit 17 is usually open ended as shown. In both FIGURES 2 and 3 the outlet end of annular space 19 is shown as being open. However, it is within the scope of the invention to partially close said open end of annular space 19, as by a perforated plate, so that the jacket gas is emitted as a plurality of annularly arranged jet streams instead of as an annulus.

Figure 4:
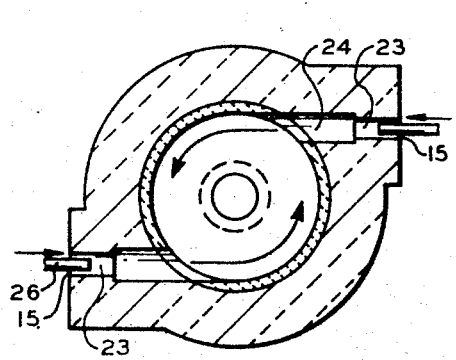
FIGURE 4 is a view, partly in cross section, taken along the lines 4—4 of FIGURE 1.

In combustion zone 14 there are arranged the inlets 15 (see FIGURE 4) which are so disposed that gas passing therethrough and into combustion zone 14 will do so in a direction tangent to the cylindrical wall of said combustion zone 14. Each tangential gas inlet 15 consists of a small conduit 23 joining a larger conduit or tunnel 24 which terminates as an opening in the refractory liner of combustion section 14. An inlet pipe 26 for the combustible mixture of gas and air extends part way into said small conduit 23 as shown.

The furnace and apparatus just described have the general conformity and are constructed and operated in the manner fully described in U.S. Patent 2,564,700. Various modifications of said furnace which can also be employed in the practice of the invention are also described in said patent. Other types of furnaces and apparatus which can also be employed in the practice of the invention are described in other patents mentioned in said Patent 2,564,700.

Figure 5:
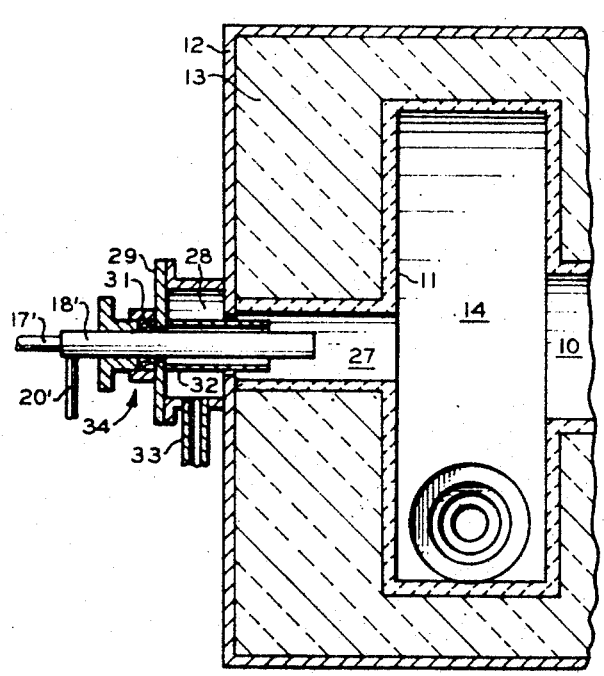
FIGURE 5 is a view, partly in cross section, of a modified furnace which can be employed in the practice of the invention.

Referring now to FIGURE 5, there is illustrated a modified carbon black furnace, the downstream end portion of which is essentially like that illustrated in FIGURE 1, described above. Said furnace of FIGURE 5 is provided with a cylindrical precombustion section 14 which is disposed upstream of, in open communication with, substantially axially aligned with, and having a diameter larger than reaction section 10. A substantially cylindrical feed introduction chamber 27 is disposed upstream of, in open communication with, substantially axially aligned with, and has a diameter within the range of ¼ to 1, preferably ¼ to ½, the diameter of said reaction section 10. A plenum chamber 28 is disposed at the upstream end of and in communication with said feed introduction chamber 27. A flange plate 29 closes the upstream end of said plenum chamber. A centrally disposed opening 31 is provided in said flange plate. A jacket gas conduit 18', closed at its upstream end, extends axially and slidably through said opening 31 into said feed introduction chamber 27. A feed inlet conduit 17' extends axially through the closed end of and through said jacket gas conduit 18' to provide an annular space (like 19 in FIGURES 2 and 3) between said conduits 17' and 18'. A cylindrical baffle 32 is attached to the inner wall of said flange plate, surrounds said jacket gas conduit 18', and extends into said feed introduction chamber 27 as shown. The purpose of said baffle 32 is to direct a cooling gas such as air, introduced into plenum chamber 28 via conduit 33, along the walls of said feed introduction chamber 27 when desired. A packing gland assembly 34 filled with a suitable heat-resistant packing such as asbestos is mounted on the outer wall of said flange plate 29 and surrounds said jacket gas conduit 18'.

Figure 6:
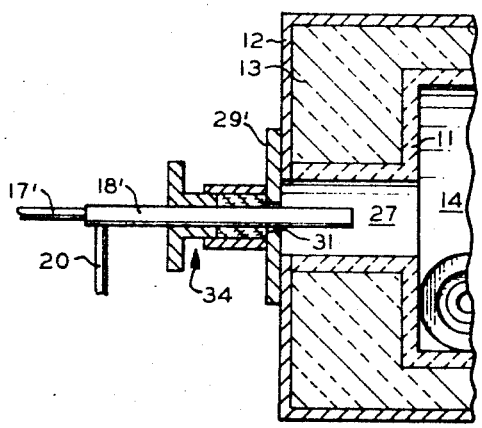
FIGURE 6 is a view, partly in cross section, of another modified furnace which can be employed in the practice of the invention.

Referring now to FIGURE 6, the modified furnace there illustrated is like that illustrated in FIGURE 5 except that flange plate 29' is mounted directly on metal shell 12 and no plenum chamber 28 is provided.

In the operation of the furnaces of FIGURES 5 and 6, a hydrocarbon feedstock, preferably a normally liquid aromatic concentrate oil, is introduced via feed inlet conduit 17'. Said feedstock is preheated in a heater, not shown, and may be vaporized or only partially vaporized. A stream of free oxygen-containing gas, as in accordance with the invention, is introduced via conduit 20' into jacket gas conduit 18'. It will be noted that conduits 17' and 18' comprise an integral assembly which is slidably disposed in opening 31' in flange plate 29 and packing assembly 34. Thus, the position of the outlet ends of conduits 17' and 18' in feed introduction chamber 27 can be varied. Feed introduction chamber 27 provides means for rapidly increasing the temperature of the hydrocarbon feedstream prior to its entry into combustion chamber 14, and the slidable mounting of conduit 18' provides means for varying the extent of said temperature increase and/or the reaction between the hydrocarbon feedstock and the oxygen in said jacket gas. The remainder of the operation of said furnace is essentially like that described above for the furnace of FIGURES 1 to 4.

The following examples will serve to further illustrate the invention. In each of the examples a series of runs was carried out in a reactor embodying the essential features of the reactor illustrated in FIGURE 1. In the reactor employed the combustion section was 37 inches in diameter and 12 inches in length. The reaction section was 12 inches in diameter. The carbon blacks made in each given series of runs were of the same type as determined by surface area. In all runs the operation was controlled to produce a 90 photelometer carbon black. The effective length of the reaction section was varied in individual runs to control the surface area and photelometer value of the carbon blacks produced.

The charge oils utilized in the various runs had the properties set forth in Table I below.

TABLE I.—OIL FEEDSTOCKS

| Oil Number | A | B | C | D | E |
|---|---|---|---|---|---|
| API Gravity | 12.8 | 3.4 | 2.8 | 2.8 | 1.7 |
| ASTM Vacuum Distillation: | | | | | |
| ° F. at 760 mm. FD | 447 | 621 | 624 | | |
| 2% | | | | 654 | 681 |
| 5% | 548 | 662 | 662 | 669 | 706 |
| 10% | 578 | 685 | 684 | 685 | 729 |
| 20% | 608 | 714 | 717 | 718 | 767 |
| 30% | 626 | 748 | 747 | 747 | 799 |
| 40% | 645 | 776 | 782 | 776 | 828 |
| 50% | 664 | 811 | 811 | 811 | 866 |
| 60% | 686 | 846 | 846 | 853 | 894 |
| 70% | 713 | 889 | 898 | 886 | 958 |
| 80% | 757 | 944 | 954 | 944 | 983 |
| 85% | | | | 1,003 | |
| 90% | 827 | 1,013 | 998 | | 1,041 |
| 95% | 868 | | | 1,063 | 1,097 |
| BMCI | 85.6 | 109.1 | 111.3 | 111 | 113 |
| Molecular Weight | 241 | 282 | 292 | | |
| Viscosity, SUS at 100° F | 66.5 | | | 1,723 | 7,664 |
| Viscosity, SUS at 210° F | 34.4 | 62.2 | 66.0 | 66.5 | 102.2 |
| Carbon, wt. percent | 88.6 | 89.9 | 89.9 | 90.0 | 89.8 |
| Hydrogen, wt. percent | 9.8 | 9.1 | 8.9 | 8.8 | 8.8 |
| Sulfur, wt. percent | 0.7 | 0.6 | 1.14 | 1.13 | 1.15 |
| Ramsbottom Carbon Res., wt. percent | 0.79 | 2.44 | 2.75 | 2.94 | 3.06 |
| BS&W, Vol. percent | 0.05 | 0.05 | 0.10 | 0.18 | 0.12 |
| Pentane Insol., wt. percent | 0.09 | 0.07 | 0.0 | 0.25 | 0.57 |
| Pour Point, ° F | 45 | 65 | 60 | 55 | 75 |
| Ash, wt. percent | 0.0 | 0.01 | 0.01 | 0.01 | |

EXAMPLE I

A series of runs was made utilizing aromatic concentrate oil A as the feedstock. This oil had a BMCI value of 85.6. Said feedstock is a conventional commercial feedstock prepared by the liquid sulfur dioxide extraction of cycle oils obtained in the catalytic cracking of gas oils. Other properties of said oil are given in Table I above. These runs were carried out under conditions for the production of a HAF (high abrasion furnace) carbon black having a 90 photelometer value and a surface area, as determined by nitrogen absorption, of 80±5 square meters per gram. Said runs were carried out in a furnace embodying the essential features of the furnace illustrated in FIGURE 1 and the feed introduction system of FIGURE 2. In all runs the tangential air rate was 140 Mc.f.h. and the tangential gas rate was 9.33 Mc.f.h. Other operating conditions, yields of carbon black, and tests on the carbon black products are set forth in Table II below. Run 1 was a control run utilizing 100 percent air as the jacket gas. In Runs 2–4, inclusive, essentially pure oxygen was substituted for the air as jacket gas.

Samples of said carbon black products from Runs 1 and 4 were compounded with natural rubber in accordance with standard procedure to produce a series of rubber compositions. The compounding recipe employed in preparing said rubber compositions was as follows:

| | Parts by weight |
|---|---|
| No. 1 smoked sheet | 100 |
| Carbon black | 50 |
| Stearic acid | 3 |
| Zinc oxide | 5 |
| Altax [1] | 0.6 |
| Sulfur | 2.5 |

[1] Benzothiazyl disulfide.

Said rubber compositions were each cured to a finished rubber by curing at 293° F. for 30 minutes. The cured rubber compositions were tested in accordance with standard rubber testing procedures as set forth hereinafter. Tests on said cured rubber compositions are also set forth in Table II below.

Samples of the carbon black products from Runs 1 and 4 were also compounded with a SBR–1000 rubber to produce a series of rubber compositions. The compounding recipe employed in preparing said SBR rubber compositions was as follows:

| | Parts by weight |
|---|---|
| SBR–1000 Rubber | 100 |
| Carbon Black | 40 |
| Zinc Oxide | 3 |
| BRT No. 7 [1] | 6 |
| Sulfur | 1.75 |
| Santocure [2] | 0.8 |

[1] A rubber softener—a refined tar with a high free carbon content, having a specific gravity of 1.20 to 1.25, and available from Allied Chemical and Dye Corporation.
[2] N-cyclohexyl-2-benzothiazyl-sulfonamide.

Said SBR rubber compositions were each cured to a finished rubber by curing at 307° F. for 30 minutes. The cured rubber compositions were tested in accordance with standard rubber testing procedures as set forth hereinafter. Tests on said cured rubber compositions are also set forth in Table II below.

TABLE II

| | Run Number | | | |
|---|---|---|---|---|
| | 1* | 2 | 3 | 4 |
| Oil Charge: | | | | |
|   Identification | A | A | A | A |
|   BMCI | 85.6 | 85.6 | 85.6 | 85.6 |
| Furnace Conditions: | | | | |
|   Oil feed, gal./hr. | 213.7 | 282.2 | 262.2 | 246.0 |
|   Oil preheat, °F. | 775 | 780 | 780 | 780 |
|   Jacket air, M c.f.h. | 4 | 0 | 0 | 0 |
|   Jacket O₂, M c.f.h. | 0 | 4 | 4 | 5 |
|   Jacket gas, Velocity, ft./sec. | 234 | 234 | 234 | 293 |
|   O₂/Oil Ratio, ft.³/gal. | 3.2 | 14.2 | 15.3 | 20.3 |
| Carbon Black Product: | | | | |
|   Yield, lbs./gal. | 3.82 | 4.30 | 4.14 | 3.76 |
|   Photometer | 89 | 89 | 91 | 90 |
|   N₂ Surface Area, sq. m./g. | 81.3 | 75.5 | 75.1 | 83.1 |
|   Oil absorption, cc./g. | 1.40 | 1.46 | 1.50 | 1.53 |
| Evaluation of Carbon Black in Natural Rubber: | | | | |
|   Comp. Mooney, ML–4 at 212° F. | 94.0 | | | 98.4 |
|   300% Modulus, p.s.i. | 2,800 | | | 2,840 |
|   Tensile, p.s.i. | 3,290 | | | 3,415 |
|   Elongation, percent | 340 | | | 350 |
|   Crosslinking, ν×10⁴ mols/cc. | 1.40 | | | 1.40 |
| Evaluation of Carbon Black in SBR–1000 Rubber: | | | | |
|   300% Modulus, p.s.i. | 1,640 | | | 1,720 |
|   Tensile, p.s.i. | 2,840 | | | |
|   Elongation, percent | 425 | | | |
|   Crosslinking, ν×10⁴, mols/cc. | 1.68 | | | 1.75 |
|   Abrasion loss, g. | 8.00 | | | 9.06 |
|   Abrasion Index | 131 | | | 115 |
|   Extrusion at 250° F., in./min. | 43.5 | | | 46.0 |
|   Extrusion at 250° F., g./min. | 122.0 | | | 126.0 |

*Control run.

Comparison of the results of Runs 1–4 in the above Table II shows that oils having a BMCI value of 85.6 are not significantly sensitive to the substitution of oxygen for air as the jacket gas. For example, comparing Runs 1 and 2, in Run 2 wherein 100 percent essentially pure oxygen was substituted for air as the jacket gas to give an oxygen to oil ratio of 14.2, compared to an oxygen to oil ratio of 3.2 for Run 1 wherein 100 percent air was used as the jacket gas, the oil absorption value in Run 2 increased to only 1.46 compared to 1.40 for Run 1. In Run 3 wherein essentially pure oxygen was used as the jacket gas to give an oxygen-oil ratio of 15.3, the oil absorption value increased to only 1.50. In Run 4 wherein the oxygen to oil ratio was increased to 20.3, the oil absorption value increased to only 1.53.

Comparison of the rubber data obtained when the carbon blacks of Runs 1 and 4 were compounded in rubber corroborates the results of the tests on the carbon black products per se. For example, the modulus value in natural rubber for the carbon black of Run 1 was 2800 p.s.i. and the modulus value for the carbon black from Run 4 was 2840 p.s.i., a very small increase. Similar results were obtained with respect to the modulus values when said carbon blacks were compounded into SBR–1000 rubber. A comparison of the abrasion index values indicates that in the case of using an oil feedstock of 85.6 BMCI, the substitution of oxygen for the jacket air was detrimental because the SBR–1000 rubber containing the carbon black of Run 4 had an abrasion index of only 115 as compared to an abrasion index of 131 for the SBR–1000 rubber containing the carbon black from Run 1. Comparison of the extrusion values shows only a small beneficial advantage for the carbon black of Run 4.

EXAMPLE II

Another series of runs utilizing aromatic concentrate oils B, C, D, and E having BMCI values of 109.1, 111.3, 111.0, and 113.0, respectively, was carried out. Said feedstocks are conventional aromatic concentrate oils from refinery operations. Other properties of said oils are set forth in Table I above. This series of runs was carried out under conditions for the production of a HAF, 90 photometer, carbon black having a surface area, as determined by nitrogen absorption, of 80±5 square meters per gram. The runs in this series were numbered 5 to 21, inclusive. Runs 5 and 6 were control runs utilizing 100 percent air as the jacket gas. In Runs 7–21, inclusive, various proportions of the jacket air, up to 100 percent, were replaced with essentially pure oxygen. Said runs were carried out in a furnace embodying the essential features of the furnace illustrated in FIGURE 1 and the feed introduction system of FIGURE 2. In all runs except Runs 7, 13, and 18 the tangential air rate and tangential gas rate (inlet 15) were 140 and 9.33M c.f.h., respectively. In Run 7 said rates were 144 and 9.33M c.f.h., respectively. In Run 13 said rates were 150 and 10.0M c.f.h., respectively. In Run 18 said rates were 100 and 6.67M c.f.h., respectively. Other operating conditions, yields, and tests on the carbon black products are set forth in Table III below.

Samples of the carbon black products from Runs 5, 9, 11, 14, 16, 19, and 21 were compounded with natural rubber in accordance with standard procedure to produce a series of rubber compositions. The compounding recipe employed in preparing said rubber compositions was as follows:

| | Parts by weight |
|---|---|
| No. 1 Smoked Sheet | 100 |
| Carbon Black | 50 |
| Stearic Acid | 3 |
| Zinc Oxide | 5 |
| Sulfur | 2.5 |
| Altax [1] | 0.6 |

[1] Benzothiazyl disulfide.

Said natural rubber compositions were each cured to a finished rubber by curing at 293° F. for 30 minutes. The cured rubber compositions were tested in accordance with standard rubber testing procedures as set forth hereinafter. Tests on said cured rubber compositions are also set forth in Table III below.

Samples of the carbon black products from said Runs 5, 9, 11, 14, 16, 19, and 21 were also compounded with a SBR-1000 rubber in accordance with standard procedure to produce a series of rubber compositions. The compounding recipe employed in preparing said rubber compositions was the same as for the SBR rubber compositions of Example I. Said SBR-1000 rubber compositions were each cured to a finished rubber by curing at 307° F. for 30 minutes. The cured rubber compositions were tested in accordance with standard rubber testing procedures as set forth hereinafter. Tests on said cured rubber compositions are also set forth in Table III below.

to give oxygen to oil ratios of 3.2 and 3.0, respectively. In Runs 7 and 8, a portion of the jacket air was replaced with essentially pure oxygen to increase the oxygen to oil ratio to 9.2 and 9.6, respectively, and the oil absorption value increased to 1.52 and 1.51, respectively. Comparing the results of said Runs 7 and 8 with Run 4 of Table II wherein the oxygen to oil ratio was 20.1 and the carbon black product had an oil absorption value of 1.53, shows that the feedstock having a BMCI value of 111.3 which was used in said Runs 7 and 8 was more than twice as sensitive to the substitution of oxygen for jacket air as was the 85.6 BMCI oil used in said Run 4 of Table II.

TABLE III

| | Run Number | | | | | | |
|---|---|---|---|---|---|---|---|
| | 5* | 6* | 7 | 8 | 9 | 10 | 11 |
| Oil Charge: | | | | | | | |
| Identification | B | C | D | D | C | D | D |
| BMCI | 109.1 | 111.3 | 111.3 | 111.3 | 111.3 | 111.3 | 111.3 |
| Furnace Conditions: | | | | | | | |
| Oil feed gal./hr | 213.8 | 231.2 | 239.0 | 254.5 | 269.2 | 258.8 | 269.0 |
| Oil preheat, °F | 550 | 555 | 550 | 545 | 550 | 555 | 545 |
| Jacket air, M c.f.h | 4 | 4 | 2 | 10 | 0 | 0 | 5 |
| Jacket $O_2$, M c.f.h | 0 | 0 | 2 | 2 | 3 | 3 | 3 |
| Jacket gas, Velocity, ft./sec | 136 | 136 | 380 | 178 | 102 | 47 | 120 |
| $O_2$/Oil Ratio, ft.³/gal | 3.2 | 3.0 | 9.2 | 9.6 | 11.5 | 11.6 | 12.2 |
| Carbon Black Product: | | | | | | | |
| Yield, lb./gal | 4.69 | 4.67 | 4.51 | 4.52 | 4.90 | 4.72 | 4.63 |
| Photelometer | 90 | 90 | 90 | 90 | 91 | 88 | 88 |
| $N_2$ Surface Area, sq. m. g | 80.9 | 79.6 | 81.1 | 79.1 | 82.7 | 75.5 | 78.3 |
| Oil absorption, cc./g | 1.44 | 1.42 | 1.52 | 1.51 | 1.55 | 1.59 | 1.61 |
| Evaluation of Carbon Black in Natural Rubber: | | | | | | | |
| Comp. Mooney, ML-4 at 212° F | 87.4 | | | | 94.4 | | 101.4 |
| 300% Modulus, p.s.i | 2,690 | | | | 3,030 | | 3,170 |
| Tensile, p.s.i | 3,600 | | | | 3,625 | | 3,680 |
| Elongation, percent | 380 | | | | 355 | | 365 |
| Crosslinking, $\nu \times 10^4$, mols/cc | 2.30 | | | | 2.34 | | 2.46 |
| Evaluation of Carbon Black in SBR-1000 Rubber: | | | | | | | |
| 300% Modulus, p.s.i | 1,600 | | | | 1,970 | | 1,810 |
| Tensile, p.s.i | 3,115 | | | | 3,240 | | 3,030 |
| Elongation, percent | 460 | | | | 455 | | 450 |
| Crosslinking, $\nu \times 10^4$, mols/cc | 1.74 | | | | 1.84 | | 1.78 |
| Abrasion loss g | 7.68 | | | | 6.69 | | 7.03 |
| Abrasion Index | 122 | | | | 139 | | 132 |
| Extrusion at 250° F., in./min | 33.5 | | | | 44.8 | | 47.5 |
| Extrusion at 250° F., g./min | 94.5 | | | | 105.0 | | 116.8 |

| | Run Number | | | | | | | | | |
|---|---|---|---|---|---|---|---|---|---|---|
| | 12 | 13 | 14 | 15 | 16 | 17 | 18 | 19 | 20 | 21 |
| Oil Charge: | | | | | | | | | | |
| Identification | D | C | D | C | C | C | E | D | D | D |
| BMCI | 111.3 | 111.3 | 111.3 | 111.3 | 111.3 | 111.3 | 113 | 111.3 | 111.3 | 111.3 |
| Furnace Conditions: | | | | | | | | | | |
| Oil feed, gal./hr | 306.0 | 302.0 | 277.8 | 272.7 | 276.4 | 289.7 | 201.0 | 276.0 | 250.7 | 266.0 |
| Oil preheat, °F | 550 | 550 | 550 | 555 | 545 | 550 | 550 | 555 | 555 | 545 |
| Jacket air, M c.f.h | 0 | 0 | 0 | 0 | 0 | 0 | 0 | 0 | 0 | 0 |
| Jacket $O^2$, M c.f.h | 4 | 4 | 4 | 4 | 4 | 5 | 4 | 4 | 2.5 | 4 |
| Jacket gas, Velocity, ft./sec | 136 | 136 | 136 | 136 | 136 | 170 | 136 | 380 | 575 | 900 |
| $O_2$/Oil Ratio, ft.³/gal | 13.1 | 13.3 | 14.4 | 14.7 | 14.5 | 17.9 | 19.9 | 14.5 | 10.0 | 15.1 |
| Carbon Black Product: | | | | | | | | | | |
| Yield, lb./gal | 4.97 | 4.73 | 4.75 | 4.66 | 4.53 | 4.87 | 4.62 | 4.99 | 4.92 | 4.87 |
| Photelometer | 76 | 91 | 91 | 91 | 90 | 89 | 90 | 91 | 91 | 90 |
| $N_2$ Surface Area, sq. m./g | 71.6 | 82.9 | 89.5 | 81.3 | 80.3 | 77.2 | 82.3 | 82.5 | 79.0 | 81.3 |
| Oil absorption, cc./g | 1.63 | 1.62 | 1.65 | 1.68 | 1.69 | 1.79 | 1.84 | 1.59 | 1.46 | 1.49 |
| Evaluation of Carbon Black in Natural Rubber: | | | | | | | | | | |
| Comp. Mooney, ML-4 at 212° F | | | 102.4 | | 107.0 | | | 106.0 | | 99.0 |
| 300% Modulus, p.s.i | | | 3,150 | | 3,130 | | | 3,080 | | 3,120 |
| Tensile, p.s.i | | | 3,620 | | 3,610 | | | 3,640 | | 3,870 |
| Elongation percent | | | 335 | | 345 | | | 340 | | 370 |
| Crosslinking, $\nu \times 10^4$, mols/cc | | | 2.52 | | 2.44 | | | 2.40 | | 2.46 |
| Evaluation of Carbon Black in SBR-1000 Rubber: | | | | | | | | | | |
| 300% Modulus | | | 1,990 | | 2,110 | | | 1,875 | | 1,775 |
| Tensile, p.s.i | | | 3,200 | | 3,200 | | | 3,120 | | 3,240 |
| Elongation, percent | | | 430 | | 415 | | | 435 | | 460 |
| Crosslinking, $\nu \times 10^4$, mols/cc | | | 1.82 | | 1.87 | | | 1.75 | | 1.75 |
| Abrasion loss, g | | | 6.64 | | 6.39 | | | 7.16 | | 7.45 |
| Abrasion Index | | | 142 | | 145 | | | 130 | | 125 |
| Extrusion at 250° F., in./min | | | 50 | | 47.0 | | | 48.3 | | 46.5 |
| Extrusion at 250° F., g./min | | | 118.5 | | 108.5 | | | 116.8 | | 115.3 |

*Control run.

Comparing the results of said Runs 5–21 in Table III above shows that hydrocarbon feedstock oils having a BMCI value above 95, specifically about 110, are very sensitive to the substitution of oxygen for the jacket air. For example, in control Runs 5 and 6 the carbon black products had oil absorption values of 1.44 and 1.42, respectively, when using 100 percent air as the jacket gas In other words, in going from the oil absorption value of 1.40 for the carbon black of Run 1 to the oil absorption value of 1.53 for the carbon black of Run 4, it was necessary to increase the oxygen to oil ratio more than sixfold. In contrast, in going from the oil absorption value of 1.44 for the carbon black of Run 5 to oil absorption value of 1.52 for the carbon black of Run 7, it was necessary to increase the oxygen to oil ratio less than threshold.

In Run 11 the oxygen to oil ratio was increased to 12.2 and the oil absorption value increased to 1.61. Comparing the results of the rubber tests on the rubber samples prepared with the carbon black of Run 11 with the results of the rubber tests on the rubber samples prepared with the carbon black of Run 5 (a control run) corroborates the said increase in oil absorption (structure characteristics) for the carbon black of Run 11. For example, the modulus value of the natural rubber sample prepared with the carbon black from Run 11 was 3170 p.s.i. whereas the modulus value for the natural rubber sample prepared with the carbon black of Run 5 was 2690. The modulus values for the SBR–1000 rubbers prepared with the carbon blacks of said Runs 5 and 11 shows similar results. The abrasion index on the rubber sample prepared with the carbon black of Run 11 was 132 compared to 122 for the abrasion index on the rubber sample prepared with the carbon black from Run 5, showing a very desirable increase in abrasion index. Likewise, the extrusion values for the SBR–1000 rubber of Run 11 compared to the extrusion values for the SBR–1000 rubber of Run 5 show that said Run 11 rubber is much superior. Similar comparisons can be developed for the other runs set forth in Table III above. Particular attention is invited to Runs 14, 16, and 19.

A comparison of Runs 16, 19, and 21 in Table III illustrates the effect of linear velocity of the jacket oxygen. The data for said runs shows that the oil charge rate, oil preheat, oxygen to oil ratio, and volume of jacket oxygen used, were substantially the same in all three of said Runs 16, 19, and 21. However, the jacket gas velocity in said runs was 136, 380, and 900 feet per second, respectively, and the oil absorption values were 1.69, 1.59, and 1.49, respectively, showing that with an increase in linear velocity there is obtained a decrease in structure characteristics (oil absorption).

Figure 7:
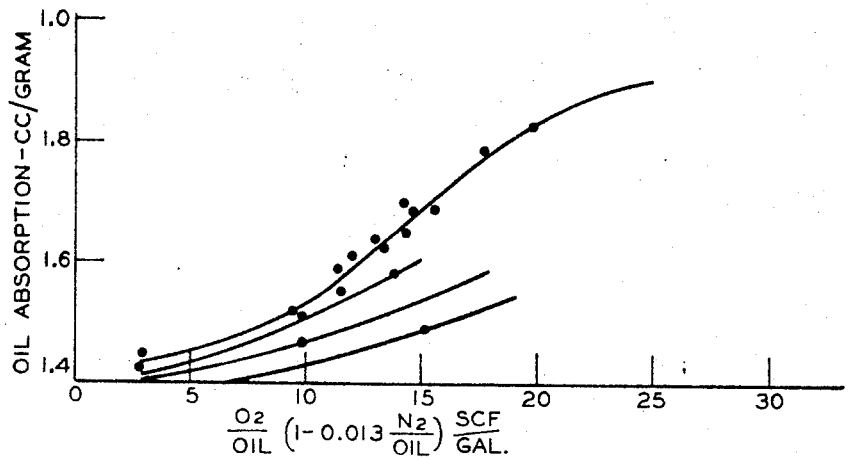
FIGURES 7 and 8 are graphs wherein the structure characteristics (as shown by oil absorption values) of carbon blacks produced in accordance with the invention have been plotted against the oxygen to oil ratios employed in producing said carbon blacks.

The results of said Runs 5–21 in the above Table III are illustrated in FIGURE 7 where oil absorption values are plotted against oxygen to oil ratio.

EXAMPLE III

Another series of runs was carried out utilizing the above-described aromatic concentrate oil A as the hydrocarbon feedstock. This series of runs was carried out under conditions for the production of ISAF (intermediate super abrasion furnace) carbon blacks having a 90 photelometer value and a surface area, as measured by nitrogen absorption, of 108±4. The runs in this series were numbered 22–24, inclusive. Run 22 was a control run utilizing 100 percent air as the jacket gas. Runs 23 and 24 utilized 100 percent essentially pure oxygen as the jacket gas. All three runs were carried out in a furnace embodying the essential features of the furnace illustrated in FIGURE 1 and the feed introduction system of FIGURE 2. In all runs the tangential air rate and the tangential gas rate (inlet 15) were 225 and 15.0 M c.f.h., respectively. Other operating conditions, yields, and tests on the carbon black products are set forth in Table IV below.

Samples of the carbon black products from Runs 22 and 24 were compounded with natural rubber in accordance with standard procedures to produce a series of rubber compositions. The compounding recipe, curing temperature, and curing time employed in preparing said rubber compositions were the same as set forth in Example I above. The cured rubber compositions were tested in accordance with standard rubber testing procedures as set forth hereinafter. Tests on said cured rubber compositions are also set forth in Table IV below.

Samples of the carbon black products from said Runs 22 and 24 were also compounded with SBR–1000 rubber and cured as described in Example I above. Tests on these rubber compositions are also set forth in Table IV below.

TABLE IV

| | Run Number | | |
|---|---|---|---|
| | 22* | 23 | 24 |
| Oil Charge: | | | |
| Identification | A | A | A |
| BMCI | 85.6 | 85.6 | 85.6 |
| Furnace Conditions: | | | |
| Oil feed, gal./hr | 261.0 | 272.6 | 253.3 |
| Oil preheat, °F | 780 | 775 | 775 |
| Jacket air, M c.f.h | 4 | 0 | 0 |
| Jacket O₂, M c.f.h | 0 | 4 | 4 |
| Jacket gas, Velocity, ft./sec | 234 | 234 | 234 |
| O₂/Oil Ratio, ft.³/gal | 2.8 | 14.7 | 15.8 |
| Carbon Black Product: | | | |
| Yield, lb./gal | 3.17 | 3.10 | 3.00 |
| Photelometer | 91 | 90 | 90 |
| N₂ Surface Area, sq. m./g | 111.4 | 104.7 | 110.7 |
| Oil absorption, cc./g | 1.40 | 1.53 | 1.51 |
| Evaluation of Carbon Black in Natural Rubber: | | | |
| Comp. Mooney, ML–4 at 212° F | 104.0 | | 105.0 |
| 300% Modulus, p.s.i | 2,600 | | 2,625 |
| Tensile, p.s.i | 3,470 | | 3,170 |
| Elongation, percent | 375 | | 355 |
| Crosslinking, $\nu \times 10^4$, mols/cc | 1.28 | | 1.32 |
| Evaluation of Carbon Black in SBR–1000 Rubber: | | | |
| 300% Modulus, p.s.i | 1,480 | | 1,590 |
| Tensile, p.s.i | 3,420 | | 3,280 |
| Elongation, percent | 495 | | 470 |
| Crosslinking, $\nu \times 10^4$, mols/cc | 1.62 | | 1.67 |
| Abrasion loss, g | 7.43 | | 7.56 |
| Abrasion Index | 141 | | 138 |
| Extrusion at 250° F., in./min | 46.7 | | 47.0 |
| Extrusion at 250° F., g./min | 124.5 | | 128.0 |

*Control run.

Comparing the results of Runs 22 and 24 show that oils having a BMCI value of less than 95, specifically 85.6, are also not significantly sensitive to the substitution of oxygen for air as the jacket gas in the production of ISAF carbon blacks. For example, in control Run 22 wherein 100 percent air was used as the jacket gas to give an oxygen to oil ratio of 2.8, the oil absorption value was 1.40, and in Run 24 wherein essentially pure oxygen was used as the jacket gas to give an oxygen to oil ratio of 15.8 the oil absorption value was 1.51.

Comparing the rubber data from said Runs 22 and 24 corroborates the oil absorption values on said carbon black products. For example, the 300 percent modulus value for the natural rubber sample using the carbon black of Run 22 was 2600 compared to 2625 p.s.i. for the natural rubber sample containing the carbon black from Run 24. The results of the modulus values for the SBR–1000 rubber samples were similar. As in the case of the HAF carbon blacks set forth in Table III above, comparison of the abrasion index values for the SBR rubber sample containing the carbon black of Run 22 with the SBR rubber sample containing the carbon black of Run 24 indicates that substitution of oxygen for air in the jacket gas is detrimental to abrasion properties. Comparison of the extrusion values on the rubber samples prepared with the carbon blacks of said Runs 22 and 24 shows that a small benefit is obtained when oxygen is substituted for air in the jacket gas.

EXAMPLE IV

Another series of runs utilizing aromatic concentrate oil E as the hydrocarbon feedstock was carried out. This oil had a BMCI value of 113 and was a conventional aromatic concentrate oil from refinery operations. Other properties of the oil are given in Table I above. This series of runs was carried out under conditions to produce an ISAF carbon black having a 90 photelometer value and a surface area, as measured by nitrogen absorption, of 108±4 square meters per gram. Runs in this series are numbered 25–32, inclusive. Runs 25 and 26 were control runs utilizing 100 percent air as jacket gas. In Runs 27–32 various proportions of the jacket air, up to 100 percent, were replaced with essentially pure oxygen as the jacket gas. All runs were carried out in a furnace embodying the essential features of the furnace illustrated in FIGURE 1 and the feed introduction system of FIGURE 2. In Run 25 the tangential air rate and tangential gas rate (inlet 15) were 250 Mc.f.h. and 16.67 Mc.f.h., respectively. In Runs 26, 27, 28, and 30 said rates were 150 and 10.0, respectively. In Run 29 said rates were 200 and 13.3, respectively. In Runs 31 and 32 said rates were 100 and 6.67, respectively. Other operating conditions, yields, and tests on the carbon black products are set forth in Table V below.

Samples of the carbon black products from Runs 25, 26, 29, 31, and 32 were compounded with natural rubber employing the same recipe, cured, and tested in accordance with standard procedures in the same manner as set forth in Example II above. Tests on said rubber samples are set forth in Table V below.

Samples of the carbon black products from said Runs 25, 26, 29, 31, and 32 were also compounded with SBR–1000 rubber employing the same recipe, cured, and tested as set forth in Example II above. The results of the tests on these rubber compositions are also set forth in Table V below.

Figure 8:
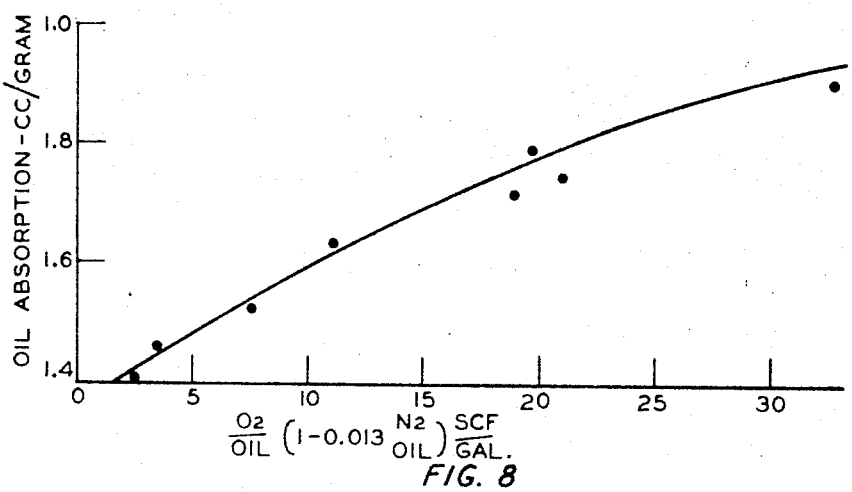

The results of said Runs 25–32 in the above Table V are illustrated in FIGURE 8 where oil adsorption values are plotted against oxygen to oil ration.

The data given above in said Tables II–V, inclusive, illustrate a number of the advantages for the substitution of oxygen for at least a portion of the jacket air in accordance with the invention. Said data show that the invention provides a method for manufacturing furnace carbon blacks having increased structure characteristics. The higher structure carbon blacks of the invention are advantageous because they are easy processing carbon blacks which are readily compounded into various types of rubber. Said higher structure carbon blacks are particularly desirable for use with the newer polybutadiene rubbers which are more difficult to compound than other rubbers. Not only are said higher structure carbon blacks easy processing blacks, but the resulting rubber composition possesses superior extrusion properties. Said higher structure blacks are also desirable for use in those rubber

TABLE V

| | Run Number | | | | | | | |
|---|---|---|---|---|---|---|---|---|
| | 25* | 26* | 27 | 28 | 29 | 30 | 31 | 32 |
| Oil Charge: | | | | | | | | |
| Identification | E | E | E | E | E | E | E | E |
| BMCI | 113 | 113 | 113 | 113 | 113 | 113 | 113 | 113 |
| Furnace Conditions: | | | | | | | | |
| Oil feed, gal/hr | 299 | 180.8 | 182.5 | 200.5 | 282.5 | 203.5 | 125.8 | 122 |
| Oil preheat, °F | 550 | 550 | 550 | 555 | 550 | 550 | 550 | 550 |
| Jacket air, M c.f.h | 4 | 4 | 3 | 2 | 0 | 0 | 0 | 0 |
| Jacket $O_2$, M c.f.h | 0 | 0 | 1 | 2 | 5.3 | 4 | 2.6 | 4 |
| Jacket gas, Velocity, ft./sec | 136 | 136 | 136 | 136 | 136 | 136 | 88 | 136 |
| $O_2$/Oil Ratio, ft.$^3$/gal | 2.4 | 3.6 | 7.4 | 10.8 | 18.8 | 19.7 | 20.7 | 32.9 |
| Carbon Black Product: | | | | | | | | |
| Yield, lb./gal | 4.15 | 4.15 | 4.09 | 4.16 | 3.95 | 3.93 | 3.93 | 3.65 |
| Photelometer | 88 | 89 | 91 | 91 | 90 | 90 | 91 | 91 |
| $N_2$ Surface Area, sq. m./g | 107.8 | 109.8 | 107.8 | 108.7 | 112.4 | 105.6 | 105.6 | 104 |
| Oil absorption, cc./g | 1.40 | 1.46 | 1.52 | 1.62 | 1.71 | 1.78 | 1.74 | 1.90 |
| Evaluation of Carbon Black in Natural Rubber: | | | | | | | | |
| Comp. Mooney, ML–4 at 212° F | 92.0 | 100.0 | | | 108.0 | | 116.6 | 123.0 |
| 300% Modulus, p.s.i | 2,680 | 2,820 | | | 2,910 | | 2,990 | 3,070 |
| Tensile, p.s.i | 3,850 | 3,560 | | | 3,400 | | 3,160 | 3,525 |
| Elongation, percent | 415 | 365 | | | 330 | | 310 | 345 |
| Crosslinking, $\nu \times 10^4$, mols/cc | 2.14 | 2.25 | | | 2.36 | | 2.42 | 2.46 |
| Evaluation of Carbon Black in SBR–1000 Rubber: | | | | | | | | |
| 300% Modulus, p.s.i | 1,570 | 1,560 | | | 1,1840 | | 1,870 | 1,940 |
| Tensile, p.s.i | 3,320 | 3,420 | | | 2,950 | | 3,010 | 3,020 |
| Elongation, percent | 470 | 485 | | | 410 | | 420 | 415 |
| Crosslinking, $\nu \times 10^4$, mols/cc | 1.56 | 1.62 | | | 1.66 | | 1.67 | 1.74 |
| Abrasion loss, g | 6.69 | 5.90 | | | 5.66 | | 5.84 | 5.59 |
| Abrasion Index | 93 | 105 | | | 110 | | 107 | 111 |
| Extrusion at 250° F., in./min | 39.8 | 46.0 | | | 50.2 | | 15 | 53 |
| Extrusion at 250° F., g./min | 94.9 | 111.5 | | | 117.5 | | 121.5 | 123.0 |

*Control run.

Comparing the results obtained in said Runs 25–32 in Table V above again shows that a hydrocarbon oil having a BMCI value of at least 95, specifically 113, is very sensitive to the substitution of oxygen for air in the jacket gas. For example, in control Runs 25 and 26 wherein 100 percent air was used as the jacket gas and the oxygen to oil ratios were 2.4 and 3.6, respectively, the oil absorption values were 1.40 and 1.46, respectively. In contrast, in Run 27 wherein the jacket air was enriched with essentially pure oxygen to give an oxygen to oil ratio of 7.4, the oil absorption value increased to 1.52. Comparing the results of said Run 27 with the results of Run 24 in Table IV shows that in Run 27 when the BMCI value of the oil feedstock was 113 it was only necessary to increase the oxygen to oil ratio to 7.4 to obtain an oil absorption value of 1.52, whereas in Run 24 when the BMCI value of the oil feedstock was 85.6 the oil absorption value was 1.51, even with an oxygen to oil ratio of 15.8. These results show that the oil having a BMCI value of 113 was twice as sensitive to the substitution of oxygen for air in the jacket gas as was the 85.6 BMCI oil of Run 24.

In Run 29 the oxygen to oil ratio was increased to 18.8 and the oil absorption value increased to 1.71. Comparison of the rubber data for the carbon black of Run 29 with the rubber data for the carbon black of Runs 25 and 26 shows that said rubber data corroborate the oil absorption results. Similar comparisons can be developed for the other runs illustrated in Table V.

formulations wherein high modulus blacks are desired. Still another advantage is that, other operating variables being substantially constant, the use of oxygen instead of air as the jacket gas makes possible an increase of about 30 percent in reactor throughput.

The BMCI correlation index referred to is a correlation index developed by the U.S. Bureau of Mines and is employed to denote aromaticity of an oil; a higher numerical index denoting a more aromatic oil. The index is calculated from the formula $$C.I. = 48640/K + 473.7G - 456.8$$

where:

C.I. = Bureau of Mines correlation index
K = Average boiling point (°K.)
G = Specific gravity @ 60° F./60° F.

Oil absorption is measured by adding oil a few drops at a time to a one gram sample of carbon black on a mixing stone or glass plate. After each addition the oil is incorporated thoroughly with a spatula, using moderate pressure. Tiny pellets are formed, gradually increasing in size as more oil is added. The end point, approached one drop of oil at a time, is reached when a single ball of stiff paste is formed. The results are reported as cc. oil per gram of black, or converted to gallons of oil per 100 pounds of black.

The photelometer test is a measure of the tar content and thus a measure of the quality of the carbon black product. The tar content of carbon black is determined by mixing 2 grams of black with 50 cc. of chloroform, boiling the mixture, filtering, and determining the percentage light transmittance of the filtrate as compared with the transmittance of a blank sample of chloroform. The comparison is preferably conducted with a photoelectric colorimeter such as a Lumetron colorimeter at a wave length of 440 mu, a light intensity of 20, and a cell 1 cm. long. A tar-free black is arbitrarily defined as one that shows in tests on samples taken after pelleting a transmittance greater than 85 percent according to this procedure. Pelleting the flocculent black (not disclosed) by the conventional processes raises the photelometer number 5 points, or more, from 80 to 85 for example. Acetone is sometimes subsitituted for chloroform in the test procedure. The percent transmittance equivalent to 85% with chloroform is about 92% with acetone. The original acetone or chloroform used for the test should be substantially colorless. When the term "photelometer" is used without naming the solvent, the convention in the art is that chloroform is the solvent employed.

In the above tables the term "300 percent modulus, p.s.i." refers to the pounds per square inch pull in a tension test when the test piece of vulcanized rubber has been stretched 300 percent of the length of the original test piece. The term "tensible p.s.i." represents the pounds per square inch pull at the point of rupture or break of the test piece undergoing the above-mentioned 300 percent modulus test. The term "elongation" represents the stretch or elongation at the point of break. All of said tests are determined in accordance with ASTM D–412–51T, and are carried out at 80° F. unless otherwise designated.

"Crosslinking" is determined from the reciprocal volume swell and equilibrium modulus as described by P. J. Flory, J. Rehner, Jr., Journal of Chemical Physics, 11, 521 (1943) and P. J. Flory, ibid., 18, 108 (1950).

"Compounded Mooney, ML–4, 212° F." is determined according to ASTM D–927–57T, using a Mooney vicometer, large rotor, 4 minutes, unless otherwise noted.

The "extrusion at 250° F." values set forth in the above Tables II–V were determined in accordance with the methods described by Garvey et al., "Industrial Engineering Chemistry," 34 pages 1309–1315 (1942).

"Abrasion loss" may be defined as the loss of weight in grams of a test piece of rubber of standard size when exposed to standard abrasion conditions. The abrasion loss values set forth in the above Tables II–V were determined employing a modified Goodyear-Huber Angle Abrader.

"Abrasion index" is included in the above tables to afford a means of more direct comparison between the rubber samples because all the samples of a given series are compared to one standard rubber sample. In calculating the abrasion index the abrasion loss in grams for the standard sample is divided by the abrasion loss for the test sample, and the quotient is multiplied by 100 to give the abrasion index. The standard sample for the runs set forth in Tables II, III, and IV above was a rubber sample prepared in the same manner as the other samples in said tables but using IRB No. 1 (Industry Reference Black No. 1) as the carbon black. For the samples set forth in Table V, the standard was a rubber sample prepared in the same manner as the other samples but using Statex 125 H, a commercially available ISAF black, as the carbon black.

The surface area values reported herein were determined in accordance with the method described by D. E. Smith in Petroleum Engineer, November 1952, page 206.

The invention is not to be limited to any particular furnace operating conditions. Any suitable conditions can be employed. In general, the temperature within the combustion section will be within the range of 2300 to 3700° F., the temperature within the reaction section will be within the range of 2500 to 3600° F., the volume ratio of tangential air to tangential gas will be within the range of 6.6 to 20, and the oil preheat temperature will be within the range of 300 to 850° F. depending upon the amount of vaporization of feedstock desired and the characteristics of said feedstock. Other suitable operating conditions outside these ranges can be used in the production of specific carbon blacks having specific properties.

Also, while the invention has been particularly described and illustrated with reference to employing a precombustion type of tangential flame furnace and process, the invention is not so limited. The invention can also be carried out in other tangential flame furnaces such as those described in the above-mentioned patents and other types of furnaces and processes for making furnace carbon black.

While certain embodiments of the invention have been described for illustrative purposes, the invention obviously is not limited thereto. Various other modifications will be apparent to those skilled in the art in view of the disclosure. Such modifications are within the spirit and scope of the invention.

We claim:

1. A carbon black furnace comprising, in combination: a substantially cylindrical elongated reaction section; a cylindrical precombustion section, disposed upstream of, and in open communication with, substantially axially aligned with, and having a diameter larger than, said reaction section; a substantially cylindrical feed introduction chamber, having a diameter less than the diameter of said precombustion section, disposed upstream of, in open communication with, and substantially axially aligned with said precombustion section; and hydrocarbon feed inlet assembly means adapted for multistream introduction into said feed introduction chamber, said assembly means adapted for discharge of all of said streams in undeflected concentric relationship.

2. A carbon black furnace in accordance with claim 1 wherein said feed introduction chamber has a diameter within the range of from ¼ to 1 times the diameter of said reaction section.

3. A carbon black furnace in accordance with claim 2 wherein said feed introduction chamber has a diameter equal to the diameter of said reaction section.

4. A carbon black furnace in accordance with claim 1, wherein a flange plate closes the upstream end of said feed introduction chamber, a centrally disposed opening is provided in said flange plate, and said feed inlet assembly means comprises: a jacket gas conduit, closed at its upstream end, and slidably extending axially through said opening in said flange plate; a feed inlet conduit extending axially through said closed end of and through said jacket gas conduit to provide an annular space between said condiuts; an inlet conduit attached to said jacket gas conduit adjacent said closed end thereof and in communication with said annular space; and a packing gland assembly mounted on the outer wall of said flange plate and surrounding said jacket gas conduit downstream from said inlet conduit.

5. A carbon black furnace in accordance with claim 1 in which said hydrocarbon feed inlet assembly is movably positionable within said feed introduction chamber.

6. A carbon black furnace in accordance with claim 5 in which said hydrocarbon feed inlet assembly comprises at least a hydrocarbon feed inlet conduit and an air inlet conduit in open communication with said feed introduction chamber, said air inlet conduit being concentric to said feed inlet conduit.

7. A carbon black furnace in accordance with claim 6 in which said air inlet conduit and said feed inlet conduit are coaxial with a cooling gas introduction conduit.

8. A carbon black furnace comprising in combination: a substantially cylindrical elongated reaction section; a cylindrical precombustion section, disposed upstream of, in open communication with, substantially axially aligned with, and having a diameter greater than, said reaction section; a substantially cylindrical feed introduction chamber, having a diameter less than the diameter of said precombustion section, disposed upstream of, in open communication with, and substantially axially aligned with said precombustion section; a hydrocarbon feed inlet assembly means movably extending from outside said furnace into said feed introduction chamber, a plenum chamber being disposed at the upstream end of and in communication with said feed introduction chamber, a flange plate closing the upstream end of said plenum chamber, a centrally disposed opening being provided in said flange plate, said feed inlet assembly means comprising a jacket gas conduit, closed at its upstream end, and slidably extending axially through said opening in said flange plate; a feed inlet conduit extending axially through said closed end of and through said jacket gas conduit to provide an annular space between said conduits; a first inlet conduit attached to said jacket gas conduit adjacent said closed end thereof and in communication with said annular space; a cylindrical baffle attached to the inner wall of said flange plate, surrounding said jacket gas conduit, and extending into said feed introduction chamber; and a packing gland assembly mounted on the outer wall of said flange plate and surrounding said jacket gas conduit downstream from said first inlet conduit.

9. A carbon black furnace in accordance with claim 8 wherein said feed introduction chamber has a diameter within the range of from ¼ to 1 times the diameter of said reaction section.

10. A carbon black furnace in accordance with claim 9 wherein said feed introduction chamber has a diameter equal to the diameter of said reaction section.

References Cited

UNITED STATES PATENTS 3,060,003   10/1962   Williams _____ 23—209.4

JAMES H. TAYMAN, JR., Primary Examiner

U.S. Cl. X.R.

23—209; 260—679; 431—154, 187, 202